(12) United States Patent
Taniguchi (10) Patent No.: US 11,745,546 B2
(45) Date of Patent: Sep. 5, 2023

(54) TIRE

(71) Applicant: SUMITOMO RUBBER INDUSTRIES, LTD., Kobe (JP)

(72) Inventor: Hidetoshi Taniguchi, Kobe (JP)

(73) Assignee: SUMITOMO RUBBER INDUSTRIES, LTD., Kobe (JP)

(*) Notice: Subject to any disclaimer, the term of this patent is extended or adjusted under 35 U.S.C. 154(b) by 292 days.

(21) Appl. No.: 17/226,516

(22) Filed: Apr. 9, 2021

(65) Prior Publication Data

US 2021/0347210 A1 Nov. 11, 2021

(30) Foreign Application Priority Data

May 7, 2020 (JP) .................................. 2020-082055

(51) Int. Cl.
*B60C 11/04* (2006.01)
*B60C 11/03* (2006.01)
*B60C 11/12* (2006.01)

(52) U.S. Cl.
CPC ............ *B60C 11/04* (2013.01); *B60C 11/032* (2013.01); *B60C 2011/036* (2013.01); (Continued)

(58) Field of Classification Search
CPC ..... B60C 2011/0344; B60C 2011/0348; B60C 2011/0351; B60C 2011/036; (Continued)

(56) References Cited

U.S. PATENT DOCUMENTS

D451,860 S * 12/2001 Schuster ...................... D12/900
D610,074 S * 2/2010 Cerny .......................... D12/579
(Continued)

FOREIGN PATENT DOCUMENTS

JP 03079405 A * 4/1991 ......... B60C 11/0309
JP 07266809 A * 10/1995 ........... B60C 11/124
(Continued)

OTHER PUBLICATIONS

Machine Translation: JP-03079405-A, Enoki Y, (Year: 2023).*
(Continued)

*Primary Examiner* — Kendra Ly
(74) *Attorney, Agent, or Firm* — Birch, Stewart, Kolasch & Birch, LLP (57) ABSTRACT

A tire 1 includes a pair of crown circumferential grooves 30, a pair of shoulder circumferential grooves 31, a crown land portion 40, and a pair of middle land portions 41 and 42, the crown land portion 40 includes a main crown shallow groove 100 and at least two sub-crown shallow grooves 101 and 102 each extending so as to communicate with the crown circumferential groove 30 and the main crown shallow groove 100, the pair of middle land portions 41 and 42 include V-shaped slots 201 and 202, respectively, and the sub-crown shallow grooves 101 and 102 and the slots 201 and 202 are located so as to be substantially point-symmetrical about a midpoint between positions at which the adjacent sub-crown shallow grooves 101 and 102 communicate with the main crown shallow groove 100.

19 Claims, 9 Drawing Sheets

(52) U.S. Cl.
CPC ............... *B60C 2011/0344* (2013.01); *B60C 2011/0348* (2013.01); *B60C 2011/0351* (2013.01); *B60C 2011/0362* (2013.01); *B60C 2011/0383* (2013.01); *B60C 2011/1254* (2013.01)

(58) Field of Classification Search
CPC ..... B60C 2011/0362; B60C 2011/1254; B60C 11/032
See application file for complete search history.

(56) References Cited

U.S. PATENT DOCUMENTS

| | | | | |
|---|---|---|---|---|
| D618,613 S | * | 6/2010 | Vandaele | D12/600 |
| D636,722 S | * | 4/2011 | Davidson | D12/602 |
| D815,021 S | * | 4/2018 | Oji | D12/900 |
| 2008/0099115 A1 | * | 5/2008 | Ohara | B60C 11/047 |
| | | | | 152/209.19 |
| 2009/0090445 A1 | * | 4/2009 | Itou | B60C 11/125 |
| | | | | 152/209.25 |
| 2012/0168048 A1 | * | 7/2012 | Suganuma | B60C 11/04 |
| | | | | 152/209.18 |
| 2014/0318677 A1 | * | 10/2014 | Kaneko | B60C 11/1259 |
| | | | | 152/209.18 |
| 2018/0162172 A1 | * | 6/2018 | Oji | B60C 11/03 |

FOREIGN PATENT DOCUMENTS

| | | | |
|---|---|---|---|
| JP | 2003136916 A | * | 5/2003 |
| JP | 2018-95079 A | | 6/2018 |
| KR | 101029033 B1 | * | 4/2011 |

OTHER PUBLICATIONS

Machine Translation: JP-07266809-A, Nakamura H, (Year: 2023).*
Machine Translation: JP-2003136916-A, Kishimoto Y, (Year: 2023).*
Machine Translation: KR-101029033-B1, N/A, (Year: 2023).*

* cited by examiner

TIRE

TECHNICAL FIELD

The present invention relates to tires.

BACKGROUND ART

A tire having small-width grooves in a land portion of a tread thereof is known. The opening edge of such a groove scratches a road surface to increase frictional force. A component in the tire axial direction of the opening edge enhances braking performance on a road surface. A component in the circumferential direction of the opening edge enhances side slip resistance during cornering on a road surface. Therefore, the tire provided with the grooves has excellent braking performance and side slip resistance on a road surface.

The configuration of these grooves, that is, a tread pattern, affects drainage performance and occurrence of uneven wear. Various studies have been conducted for the tread pattern (for example, PATENT LITERATURE 1).

CITATION LIST

Patent Literature

PATENT LITERATURE 1: Japanese Laid-Open Patent Publication No. 2018-95079

SUMMARY OF INVENTION

Technical Problem

In the above-described tire provided with the grooves, the stiffness of the land portion is decreased. Therefore, there is a problem that punch wear starting from the groove is promoted and uneven wear resistance tends to deteriorate.

An object of the present invention is to provide a tire having improved uneven wear resistance.

Solution to Problem

The present invention is directed to a tire including four circumferential grooves and five land portions provided in a tread thereof, wherein the circumferential grooves include a pair of crown circumferential grooves located on both sides of a tire equator, and a pair of shoulder circumferential grooves located outward of the crown circumferential grooves, the land portions include a crown land portion demarcated by the crown circumferential grooves, and a pair of middle land portions each demarcated by the crown circumferential groove and the shoulder circumferential groove, the crown land portion includes a main crown shallow groove extending at the tire equator, and at least two sub-crown shallow grooves each extending so as to communicate with the crown circumferential groove and the main crown shallow groove, the pair of middle land portions includes V-shaped slots recessed from a tread surface, respectively, and the sub-crown shallow grooves and the slots are located so as to be substantially point-symmetrical about a midpoint between positions at which the adjacent sub-crown shallow grooves communicate with the main crown shallow groove.

Advantageous Effects of Invention

The tire according to the present invention has improved uneven wear resistance.

DESCRIPTION OF EMBODIMENTS

The following will describe in detail the present invention based on preferred embodiments with appropriate reference to the drawings.

(1) An embodiment of the present invention is directed to a tire including four circumferential grooves and five land portions provided in a tread thereof, wherein the circumferential grooves include a pair of crown circumferential grooves located on both sides of a tire equator, and a pair of shoulder circumferential grooves located outward of the crown circumferential grooves, the land portions include a crown land portion demarcated by the crown circumferential grooves, and a pair of middle land portions each demarcated by the crown circumferential groove and the shoulder circumferential groove, the crown land portion includes a main crown shallow groove extending at the tire equator, and at least two sub-crown shallow grooves each extending so as to communicate with the crown circumferential groove and the main crown shallow groove, the pair of middle land portions includes V-shaped slots recessed from a tread surface, respectively, and the sub-crown shallow grooves and the slots are located so as to be substantially point-symmetrical about a midpoint between positions at which the adjacent sub-crown shallow grooves communicate with the main crown shallow groove.

The above tire according to (1) has improved uneven wear resistance.

(2) In the tire according to (1), a shortest length from an opening edge of each of the slots to an edge of the middle land portion is equal to or greater than 5% and equal to or less than 75% of a width of the middle land portion.

(3) In the tire according to (2), the shortest length from the opening edge of each of the slots to the edge of the middle land portion is equal to or greater than 15% and equal to or less than 35% of the width of the middle land portion.

(4) In the tire according to any one of (1) to (3), a shortest length from a bent portion of each of the slots that is bent in a V shape to a straight line connecting a first end and a second end that are both ends in a longitudinal direction of the slot is equal to or greater than 0.1% and equal to or less than 80% of the width of the middle land portion.

(5) In the tire according to (4), the shortest length from the bent portion of each of the slots that is bent in a V shape to the straight line connecting the first end and the second end that are both ends in the longitudinal direction of the slot is equal to or greater than 15% and equal to or less than 35% of the width of the middle land portion.

(6) In the tire according to any one of (1) to (5), a width of each of the main crown shallow groove and the sub-crown shallow grooves is equal to or greater than 1% and equal to or less than 30% of a width of the crown land portion.

(7) In the tire according to (6), the width of each of the main crown shallow groove and the sub-crown shallow grooves is equal to or greater than 3% and equal to or less than 7% of the width of the crown land portion.

(8) In the tire according to any one of (1) to (7), each of the slots is located so as to intersect a reference line that is parallel to a tire axial direction and that passes through a position at which the sub-crown shallow groove communicates with the crown circumferential groove.

(9) In the tire according to (8), a straight line connecting a bent portion of each of the slots and the position at which the sub-crown shallow groove communicates with the crown circumferential groove forms an angle equal to or greater than 0° and equal to or less than 15° with respect to the reference line.

(10) In the tire according to (9), the straight line connecting the bent portion of each of the slots and the position at which the sub-crown shallow groove communicates with the crown circumferential groove forms an angle equal to or greater than 2° and equal to or less than 8° with respect to the reference line.

(11) In the tire according to any one of (8) to (10), one of the slots of the pair of middle land portions each of which is located so as to intersect the reference line is located on the crown circumferential groove side, and the other slot is located on the shoulder circumferential groove side.

(12) In the tire according to any one of (1) to (11),
the pair of middle land portions each include the slots adjacent to each other in a circumferential direction, and
a shortest length between the slots adjacent to each other is equal to or greater than 0.1% and equal to or less than 2.5% of a length of a tire circumference.

(13) In the tire according to (12), the shortest length between the slots adjacent to each other is equal to or greater than 0.4% and equal to or less than 0.8% of the length of the tire circumference.

(14) In the tire according to any one of (1) to (13), a depth of each of the slots is equal to or greater than 1% and equal to or less than 35% of a depth of each circumferential groove.

(15) In the tire according to (14), the depth of each of the slots is equal to or greater than 5% and equal to or less than 14% of the depth of each circumferential groove.

(16) In the tire according to any one of (1) to (15), a straight line connecting a first end and a second end that are both ends in a longitudinal direction of each of the slots forms an angle equal to or greater than 45° and equal to or less than 90° with respect to the tire axial direction.

(17) In the tire according to (16), the straight line connecting the first end and the second end that are both ends in the longitudinal direction of each of the slots forms an angle equal to or greater than 80° and equal to or less than 90° with respect to the tire axial direction.

(18) In the tire according to any one of (1) to (17), a straight line extending from a first end that is an end in a longitudinal direction of each of the slots to a bent portion of each of the slots that is bent in a V shape, and a straight line extending from a second end that is another end in the longitudinal direction of each of the slots to the bent portion each form an angle equal to or greater than 45° and equal to or less than 90° with respect to the tire axial direction.

(19) In the tire according to any one of (1) to (18), each of the sub-crown shallow grooves communicates with the main crown shallow groove at an angle equal to or greater than 40° and equal to or less than 60°.

(20) In the tire according to any one of (1) to (18), a depth of each of the main crown shallow groove and the sub-crown shallow grooves is equal to or greater than 1% and equal to or less than 35% of the depth of each circumferential groove.

The tire in (2) to (20) has further improved uneven wear resistance.

Figure 1:
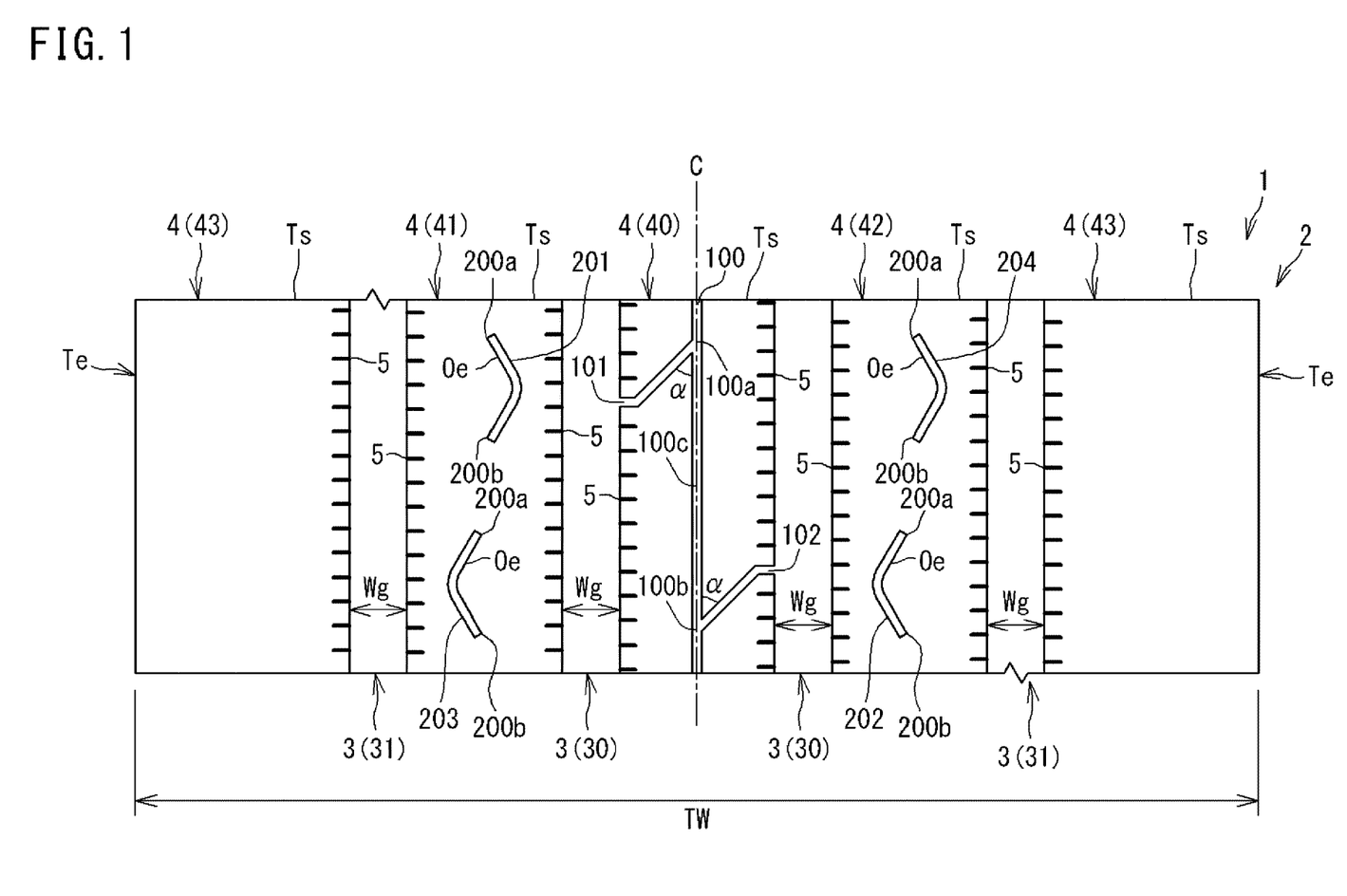
FIG. 1 is a development showing a tread of a tire according to an embodiment of the present invention.

FIG. 1 shows a development of a tread 2 of a tire 1 showing an embodiment of the present invention. The present invention can be used for various tires such as a pneumatic tire for a passenger car or for a heavy-duty vehicle and a non-pneumatic tire the interior of which is not filled with pressurized air. The tire 1 according to the present embodiment is a pneumatic tire for a heavy-duty vehicle.

The present embodiment relates to the tire 1 including four circumferential grooves 3 and five land portions 4 provided in the tread 2. The circumferential grooves 3 include a pair of crown circumferential grooves 30 located on both sides of a tire equator C, and a pair of shoulder circumferential grooves 31 located outward of the crown circumferential grooves 30. The land portions 4 include a crown land portion 40 demarcated by the crown circumferential grooves 30, and a first middle land portion 41 and a second middle land portion 42 each demarcated by the crown circumferential groove 30 and the shoulder circumferential groove 31. The crown land portion 40 includes a main crown shallow groove 100 extending at the tire equator C, and a first sub-crown shallow groove 101 and a second sub-crown shallow groove 102 each extending so as to communicate with the crown circumferential groove 30 and the main crown shallow groove 100. The first middle land portion 41 includes a V-shaped first slot 201 recessed from a tread surface Ts. The second middle land portion 42 includes a V-shaped second slot 202 recessed from the tread surface Ts. The first sub-crown shallow groove 101 and the second sub-crown shallow groove 102, and the first slot 201 and the second slot 202 are located so as to be substantially point-symmetrical about a midpoint 100c between a first position 100a at which the first sub-crown shallow groove 101 communicates with the main crown shallow groove 100 and a second position 100b at which the second sub-crown shallow groove 102 communicates with the main crown shallow groove 100.

In FIG. 1, the up-down direction is the circumferential direction of the tire 1, the right-left direction is the axial direction of the tire 1, and the direction perpendicular to the surface of the sheet is the radial direction of the tire 1. In FIG. 1, an alternate long and short dash line C represents the tire equator of the tire 1.

The tread 2 has the four circumferential grooves 3 continuously extending in the circumferential direction of the tire 1. In the present embodiment, the circumferential grooves 3 include the pair of crown circumferential grooves 30 located on both sides of the tire equator C, and the pair of shoulder circumferential grooves 31 each located between the crown circumferential groove 30 and a tread end Te.

The "tread end" Te is defined as a ground contact position on the outermost side in the tire axial direction when: a normal load is applied to the tire 1 in a normal state where the tire 1 is mounted on a normal rim and inflated to a normal internal pressure and no load is applied to the tire 1; and the tire 1 is brought into contact with a flat surface at a camber angle of 0 degrees. In the normal state, the distance in the tire axial direction between both tread ends Te is defined as a tread width TW. Unless otherwise specified, the dimensions and angles of components of the tire 1 are values measured in the normal state.

The "normal rim" means a rim specified in a standard on which the tire 1 is based. The "standard rim" in the JATMA standard, the "Design Rim" in the TRA standard, and the "Measuring Rim" in the ETRTO standard are normal rims.

The "normal internal pressure" means an internal pressure specified in the standard on which the tire 1 is based. The "highest air pressure" in the JATMA standard, the "maximum value" recited in "TIRE LOAD LIMITS AT VARIOUS COLD INFLATION PRESSURES" in the TRA standard, and the "INFLATION PRESSURE" in the ETRTO standard are normal internal pressures. In the case where the tire 1 is for a passenger car, the normal internal pressure is 180 kPa.

A "normal load" means a load specified in the standard on which the tire 1 is based. The "maximum load capacity" in the JATMA standard, the "maximum value" recited in the "TIRE LOAD LIMITS AT VARIOUS COLD INFLATION PRESSURES" in the TRA standard, and the "LOAD CAPACITY" in the ETRTO standard are normal loads.

The crown circumferential grooves 30 and the shoulder circumferential grooves 31 extend in a straight manner. During running on a wet road surface, such circumferential grooves 3 can effectively drain water within the grooves rearward in the travelling direction. Therefore, the tire 1 exhibits excellent wet performance.

A groove width Wg of each circumferential groove 3 is preferably 2% to 8% of the tread width TW. In addition, the depth of each circumferential groove 3 is preferably, for example, 10 to 20 mm.

The tread 2 has the first middle land portion 41 and the second middle land portion 42 each demarcated by the crown circumferential groove 30 and the shoulder circumferential groove 31, the one crown land portion 40 demarcated by the crown circumferential grooves 30, and a pair of shoulder land portions 43 each demarcated between the shoulder circumferential groove 31 and the tread end Te.

The crown land portion 40, the first middle land portion 41, the second middle land portion 42, and the shoulder land portions 43 have sipes 5 at the edges thereof on the circumferential groove 3 side. Such sipes 5 improve the wet performance of the tire 1 by scratching force of the edges or groove edges thereof. The "sipe" is a slit having a width less than 2 mm.

The crown land portion 40 includes the main crown shallow groove 100 continuously extending in the circumferential direction at the tire equator C, and the first sub-crown shallow groove 101 and the second sub-crown shallow groove 102 each extending so as to communicate with the crown circumferential groove 30 and the main crown shallow groove 100. Each of the first sub-crown shallow groove 101 and the second sub-crown shallow groove 102 communicates with the main crown shallow groove 100 at an angle α.

The first middle land portion 41 in the present embodiment has the V-shaped first slot 201 and a V-shaped third slot 203 each recessed from the tread surface Ts. The second middle land portion 42 has the V-shaped second slot 202 and a V-shaped fourth slot 204 each recessed from the tread surface Ts. Each of the first slot 201, the second slot 202, the third slot 203, and the fourth slot 204 has a first end 200a and a second end 200b which are both ends in the longitudinal direction thereof. In addition, each of the first slot 201, the second slot 202, the third slot 203, and the fourth slot 204 has an opening edge Oe connecting the first end 200a and the second end 200b in the tread surface Ts. The first slot 201, the second slot 202, the third slot 203, and the fourth slot 204 can disperse loads acting on the first middle land portion 41 and the second middle land portion 42, in multiple directions. Thus, deformation of the first middle land portion 41 and the second middle land portion 42 is suppressed. As a result, the uneven wear resistance of the tire 1 is improved. Here, the first end 200a and the second end 200b are positions, on the opening edge Oe, at which the opening edge Oe other than the first end 200a and the second end 200b is not present on a straight line connecting the first end 200a and the second end 200b in the tread surface Ts.

Figure 2A:
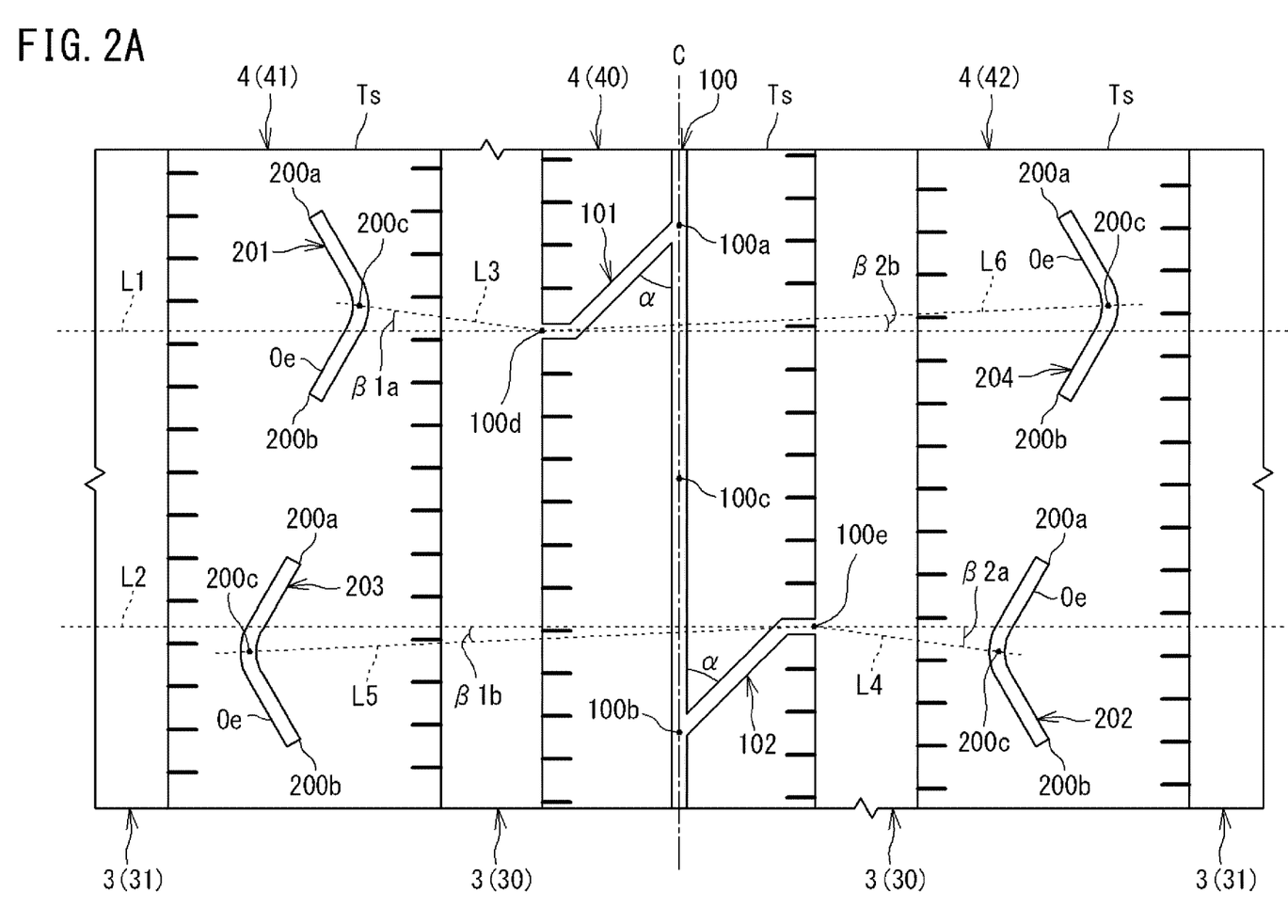
FIG. 2A is an enlarged view showing a crown land portion, crown circumferential grooves, a first middle land portion, a second middle land portion, and shoulder circumferential grooves in FIG. 1.
Figure 2B:
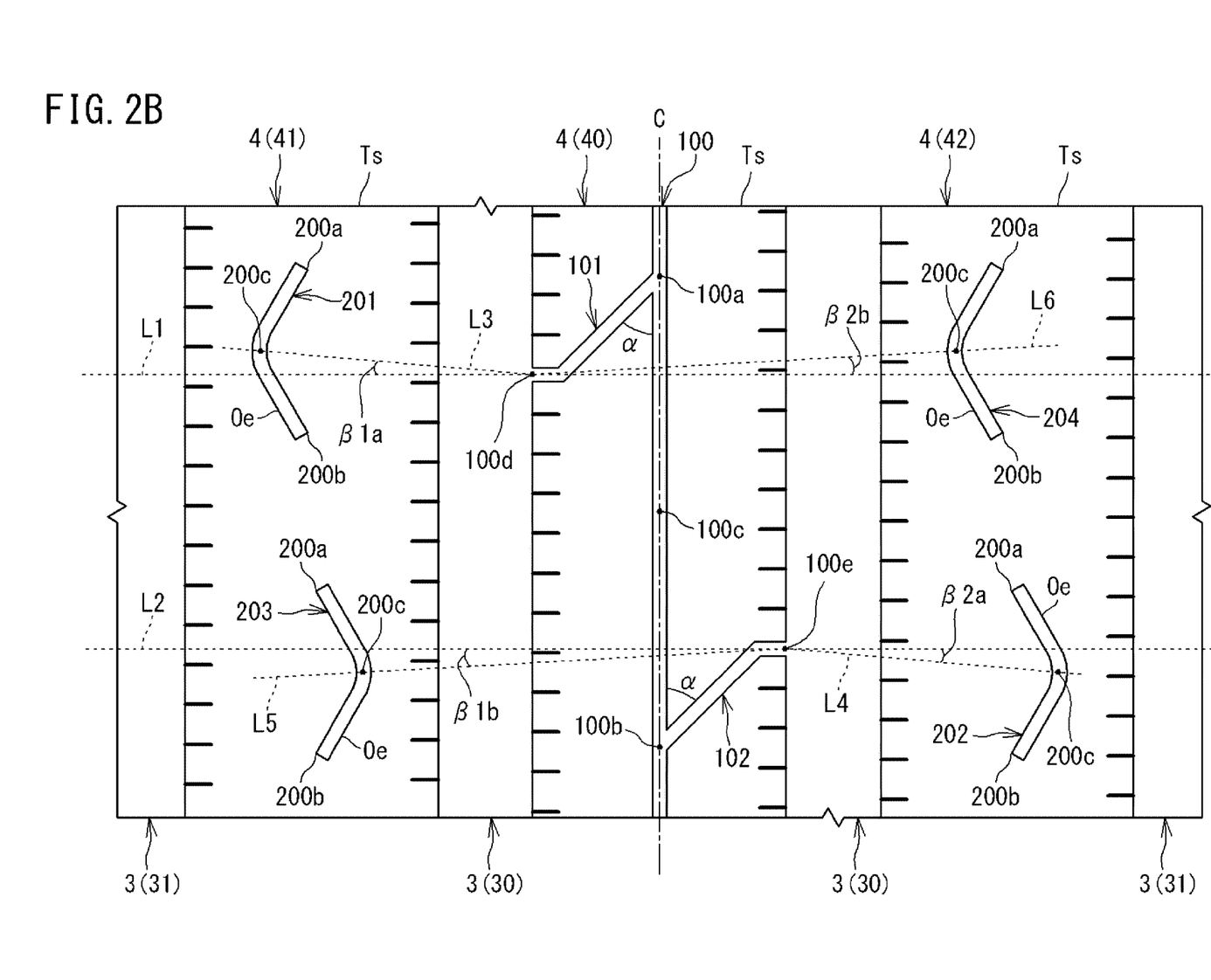
FIG. 2B is a diagram showing a first modification in which arrangement of slots in FIG. 2A is changed.
Figure 2C:
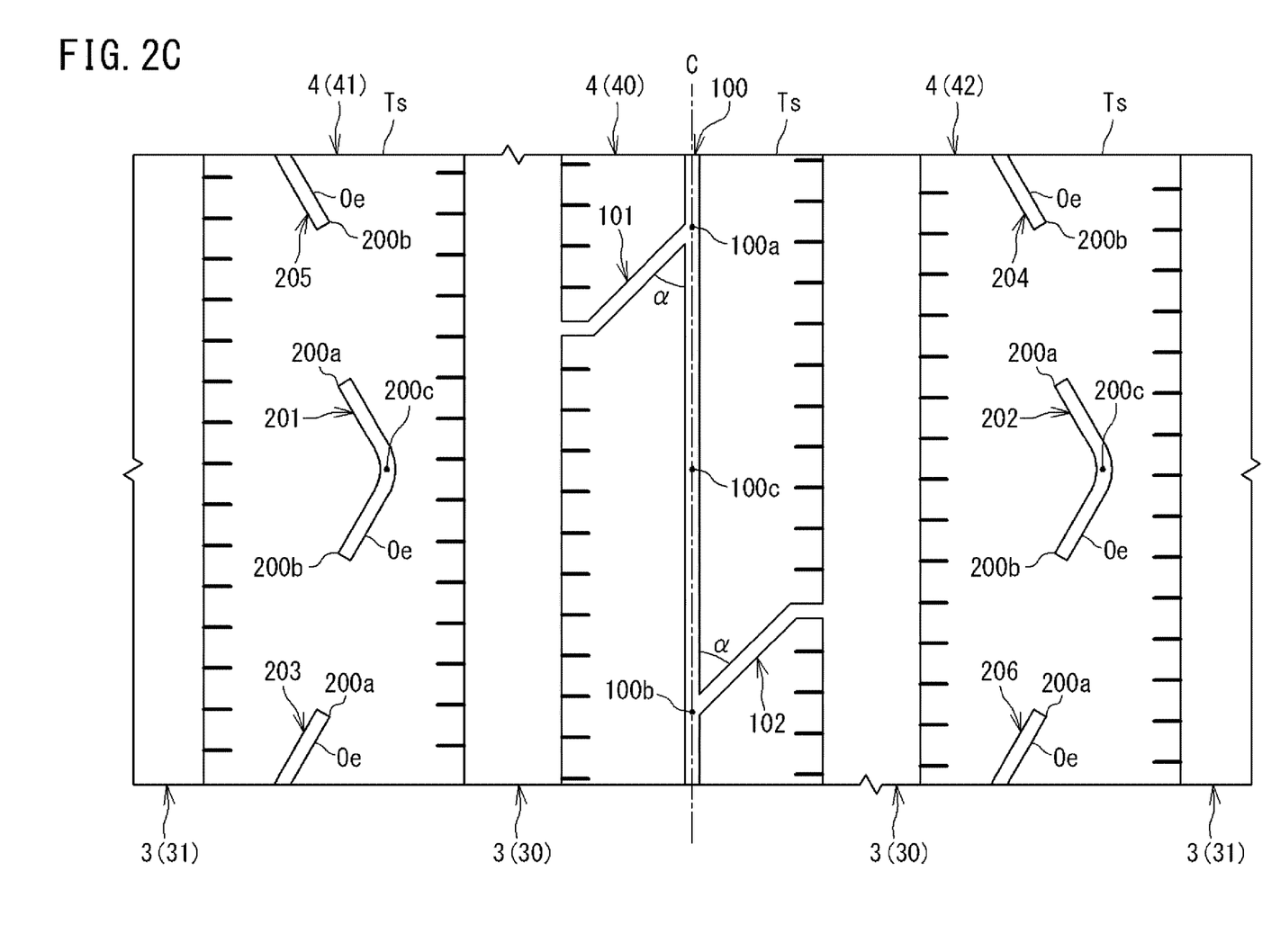
FIG. 2C is a diagram showing a second modification in which the arrangement of the slots in FIG. 2A is changed.

FIG. 2A is an enlarged view showing the crown land portion 40, the crown circumferential grooves 30, the first middle land portion 41, the second middle land portion 42, and the shoulder circumferential grooves 31 in FIG. 1 of the present embodiment. FIG. 2B is a diagram showing a first modification in which the arrangement of the slots in FIG. 2A is changed. FIG. 2C is a diagram showing a second modification in which the arrangement of the slots in FIG. 2A is changed. The first slot 201, the second slot 202, the third slot 203, and the fourth slot 204 which are shown in FIG. 2A, FIG. 2B, and FIG. 2C, and a fifth slot 205 and a sixth slot 206 which are shown in FIG. 2C each have a V-shape extending toward a bent portion 200c located at the center in the longitudinal direction of each slot. In the present embodiment, the bent portion 200c is located at the center in the longitudinal direction of the slot, but the position of the bent portion 200c is not limited thereto. For example, the bent portion 200c may be located within 10% of the length in the longitudinal direction of the slot from the center in the longitudinal direction of the slot.

In FIG. 2A, FIG. 2B, and FIG. 2C, at the tire equator C, the first sub-crown shallow groove 101 and the second sub-crown shallow groove 102 are located so as to be substantially point-symmetrical about the midpoint 100c between the first position 100a at which the first sub-crown shallow groove 101 communicates with the main crown shallow groove 100 and the second position 100b at which the second sub-crown shallow groove 102 communicates with the main crown shallow groove 100. In addition, the first slot 201 and the second slot 202, the third slot 203 and the fourth slot 204, and the fifth slot 205 and the sixth slot 206 are also located so as to be substantially point-symmetrical about the midpoint 100c. Here, "substantially point-symmetrical" indicates that a straight line connecting two positions having a point-symmetrical relationship in the tread surface Ts intersects a circle centered on the midpoint 100c and having a radius equal to 1% of the tread width TW. For example, a straight line connecting the bent portion 200c of the first slot 201 and the bent portion 200c of the second slot 202 intersects a circle centered on the midpoint 100c and having a radius equal to 1% of the tread width TW (not shown). When the sub-crown shallow grooves and the slots are located so as to be substantially point-symmetrical about the midpoint 100c, the force acting on the tire 1 during running is effectively dispersed. As a result, the uneven wear resistance of the tire 1 is improved.

The first slot 201 and the fourth slot 204 which are shown in FIG. 2A and FIG. 2B are located so as to intersect a first reference line L1 that is parallel to the tire axial direction and that passes through a third position 100d at which the first sub-crown shallow groove 101 communicates with the crown circumferential groove 30. In addition, the second slot 202 and the third slot 203 are located so as to intersect a second reference line L2 that is parallel to the tire axial direction and that passes through a fourth position 100e at which the second sub-crown shallow groove 102 communicates with the crown circumferential groove 30. The arrangement of the sub-crown shallow grooves and the slots shown in FIG. 2A and FIG. 2B allows the force acting on the tire 1 during running to be effectively dispersed. Thus, the wear resistance of the tire 1 is further improved.

A straight line L3 shown in FIG. 2A and FIG. 2B and connecting the bent portion 200c of the first slot 201 and the third position 100d forms an angle β1a with respect to the first reference line L1. A straight line L4 connecting the bent portion 200c of the second slot 202 and the fourth position 100e forms an angle β2a with respect to the second reference line L2. A straight line L5 connecting the bent portion 200c of the third slot 203 and the fourth position 100e forms an angle 131b with respect to the second reference line L2. A straight line L6 connecting the bent portion 200c of the fourth slot 204 and the third position 100d forms an angle 132b with respect to the first reference line L1. As described above, the first slot 201 and the second slot 202, and the third slot 203 and the fourth slot 204 are located so as to be substantially point-symmetrical about the midpoint 100c. Thus, the angle β1a and the angle β2a are substantially equal to each other, and the angle β1b and the angle β2b are substantially equal to each other.

The angle 131a and the angle β2a shown in FIG. 2A are each 8°, the angle β1b and the angle β2b shown in FIG. 2A are each 2°, and each of these angles is equal to or greater than 0° and equal to or less than 15°. In addition, the angle 131a and the angle β2a shown in FIG. 2B are each 6°, the angle β1b and the angle (32b shown in FIG. 2B are each 4°, and each of these angles is equal to or greater than 0° and equal to or less than 15°. That is, in the present embodiment and the first modification, the bent portion 200c is located near the first reference line L1 or the second reference line L2. Thus, the forces generated in the crown land portion 40, the first middle land portion 41, and the second middle land portion 42 during cornering are effectively relieved by the sub-crown shallow grooves and the slots. As a result, the wear resistance of the tire 1 is further improved.

As for the first slot 201 and the fourth slot 204 shown in FIG. 2A and located so as to intersect the reference line L1, the first slot 201 is located on the crown circumferential groove 30 side of the first middle land portion 41, and the fourth slot 204 is located on the shoulder circumferential groove 31 side of the second middle land portion 42. In addition, as for the second slot 202 and the third slot 203 shown in FIG. 2A and located so as to intersect the reference line L2, the second slot 202 is located on the crown circumferential groove 30 side of the second middle land portion 42, and the third slot 203 is located on the shoulder circumferential groove 31 side of the first middle land portion 41. As for the first slot 201 and the fourth slot 204 shown in FIG. 2B and located so as to intersect the reference line L1, the first slot 201 is located on the shoulder circumferential groove 31 side of the first middle land portion 41, and the fourth slot 204 is located on the crown circumferential groove 30 side of the second middle land portion 42. In addition, as for the second slot 202 and the third slot 203 shown in FIG. 2B and located so as to intersect the reference line L2, the second slot 202 is located on the shoulder circumferential groove 31 side of the second middle land portion 42, and the third slot 203 is located on the crown circumferential groove 30 side of the first middle land portion 41. That is, in the present embodiment and the first modification, the respective slots located so as to intersect the respective reference lines are located alternately on the crown circumferential groove 30 side and the shoulder circumferential groove 31 side. Thus, the force acting on the tire 1 during running is effectively dispersed by the respective slots. As a result, the wear resistance of the tire 1 is further improved.

Figure 3A:
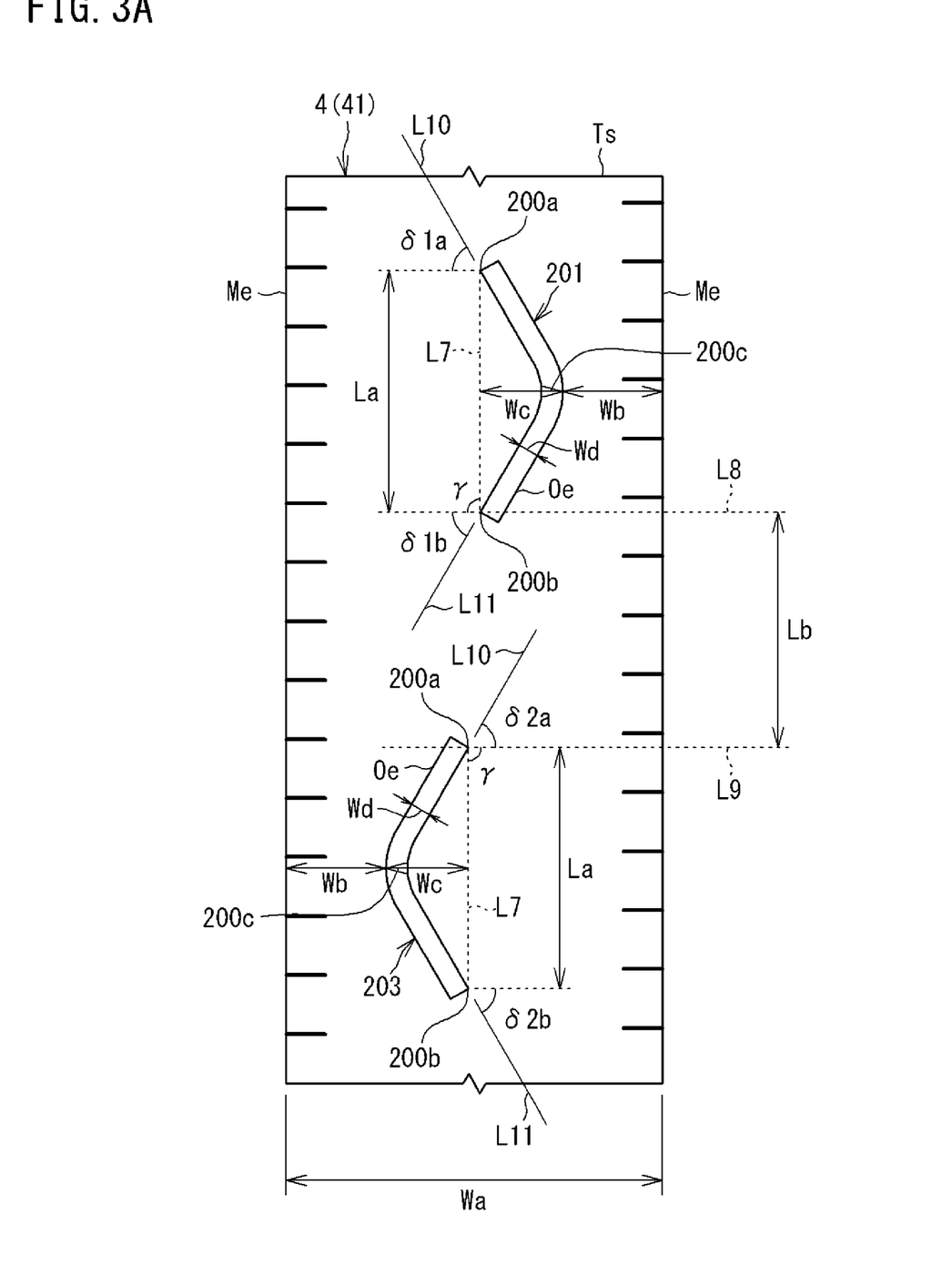
FIG. 3A is an enlarged view of the middle land portion in FIG. 1.

FIG. 3A is an enlarged view of the first middle land portion 41. Me indicates the edges of the first middle land portion 41. The following will describe the first slot 201 and the third slot 203 of the first middle land portion 41 with reference to FIG. 3A. As described above, the first slot 201 and the third slot 203 of the first middle land portion 41 have a substantially point-symmetrical relationship with the second slot 202 and the fourth slot 204 of the second middle land portion 42 about the midpoint 100c. Thus, the description of the first slot 201 and the third slot 203 of the first middle land portion 41 can be replaced with the description of the second slot 202 and the fourth slot 204 of the second middle land portion 42 by replacing the first middle land portion 41 with the second middle land portion 42, replacing the first slot 201 with the second slot 202, and replacing the third slot 203 with the fourth slot 204.

In the present embodiment, a width Wa in the tire axial direction of the first middle land portion 41 is preferably 13% to 16% of the tread width TW (shown in FIG. 1).

A shortest length Wb from the opening edge Oe in the tread surface Ts of each of the first slot 201 and the third slot 203 to the edge Me of the first middle land portion 41 may be equal to or greater than 5% and equal to or less than 75% of the width Wa of the first middle land portion 41.

In the present embodiment, the shortest length from the opening edge Oe, on the most projecting side in the tire axial direction, of the bent portion 200c of each of the first slot 201 and the third slot 203 to the edge Me of the first middle land portion 41 is the length Wb. The length Wb of each of the first slot 201 and the third slot 203 is 25% of the width Wa of the first middle land portion 41. In the present embodiment, the lengths Wb of the first slot 201 and the third slot 203 are equal to each other, but are not limited thereto. The lengths Wb of the first slot 201 and the third slot 203 may be different from each other. As described above, the first slot 201 and the third slot 203 of the first middle land portion 41 have a substantially point-symmetrical relationship with the second slot 202 and the fourth slot 204 of the second middle land portion 42 about the midpoint 100c. Thus, the lengths Wb of the first slot 201 and the second slot 202 are substantially equal to each other. Similarly, the lengths Wb of the third slot 203 and the fourth slot 204 are also substantially equal to each other. When each length Wb is equal to or greater than 5% and equal to or less than 75% of the width Wa, a decrease in the stiffness of the first middle land portion 41 due to the first slot 201 and the third slot 203 is suppressed. Thus, local uneven wear and tearing of the first middle land portion 41 due to the force acting on the tire 1 during running is reduced. As a result, the wear resistance of the tire 1 is improved. From the viewpoint of effectively reducing local uneven wear and tearing, the length Wb is more preferably equal to or greater than 15% and equal to or less than 35% of the width Wa.

A shortest length Wc from the opening edge Oe of each of the first slot 201 and the third slot 203 on the side on which the bend of the V shape projects most with respect to a straight line L7 connecting the first end 200*a* and the second end 200*b* in the tread surface Ts of each of the first slot 201 and the third slot 203, to the straight line L7 connecting the first end 200*a* and the second end 200*b* in the tread surface Ts, may be equal to or greater than 0.1% and equal to or less than 80% of the width Wa of the first middle land portion 41.

In the present embodiment, the length Wc is the width in the tire axial direction of each of the first slot 201 and the third slot 203. In the present embodiment, the shortest length Wc from the opening edge Oe, on the most projecting side in the tire axial direction, of the bent portion 200*c* of each of the first slot 201 and the third slot 203 to the straight line connecting the first end 200*a* and the second end 200*b* is 25% of the width Wa of the first middle land portion 41. The lengths Wc of the first slot 201 and the third slot 203 may be different from each other. In addition, the lengths Wc of the first slot 201 and the second slot 202 are substantially equal to each other. Similarly, the lengths Wc of the third slot 203 and the fourth slot 204 are also substantially equal to each other. When each length Wc is equal to or greater than 0.1% of the width Wa, force from a direction oblique to the rotation direction of the tire 1 is relieved. Thus, uneven wear of the first middle land portion 41 during lane change or cornering is reduced. In addition, when each length Wc is equal to or less than 80% of the width Wa, the inclination of the opening edge Oe extending from the first end 200*a* to the bent portion 200*c* and from the second end 200*b* to the bent portion 200*c*, relative to the rotation direction of the tire 1, is ensured. Thus, occurrence of catching and uneven wear such as rib punch during running is suppressed. As a result, the wear resistance of the tire 1 is improved. From the viewpoint of effective suppression of occurrence of uneven wear, the length Wc is preferably equal to or greater than 15% and equal to or less than 35% of the width Wa.

A width Wd of each of the first slot 201 and the third slot 203 may be equal to or greater than 1% and equal to or less than 50% of the width Wa of the first middle land portion 41.

In the present embodiment, the width Wd of each of the first slot 201 and the third slot 203 is 3.3% of the width Wa. The widths Wd of the first slot 201 and the third slot 203 may be different from each other. In addition, the widths Wd of the first slot 201 and the second slot 202 are substantially equal to each other. Similarly, the widths Wd of the third slot 203 and the fourth slot 204 are also substantially equal to each other. When each width Wd is equal to or greater than 1% and equal to or less than 50% of the width Wa, the first slot 201 and the third slot 203 can relieve the force generated in the first middle land portion 41 during cornering. Therefore, uneven wear of the first middle land portion 41 is suppressed. As a result, the wear resistance of the tire 1 is improved. From the viewpoint of effectively suppressing uneven wear, the width Wd is preferably equal to or greater than 3% and equal to or less than 7% of Wa.

A length La of the straight line L7 connecting the first end 200*a* and the second end 200*b* in the tread surface Ts of each of the first slot 201 and the third slot 203 may be equal to or greater than 0.4% and equal to or less than 0.8% of the length of the tire circumference.

In the present embodiment, the length La of each of the first slot 201 and the third slot 203 is 0.6% of the length of the tire circumference. The lengths La of the first slot 201 and the third slot 203 may be different from each other. In addition, the lengths La of the first slot 201 and the second slot 202 are substantially equal to each other. Similarly, the lengths La of the third slot 203 and the fourth slot 204 are also substantially equal to each other. When each length La is equal to or greater than 0.4% of the length of the tire circumference, the first slot 201 and the third slot 203 can relieve the force generated in the first middle land portion 41 during cornering. When each length La is equal to or less than 0.8% of the length of the tire circumference, the stiffness of the first middle land portion 41 is maintained. Therefore, the wear resistance of the tire 1 is improved.

A shortest length Lb from a straight line L8 that is parallel to the tire axial direction and that passes through the second end 200*b* of the first slot 201 in the tread surface Ts to a straight line L9 that is parallel to the tire axial direction and that passes through the first end 200*a* of the third slot 203 in the tread surface Ts may be equal to or greater than 0.1% and equal to or less than 2.5% of the length of the tire circumference.

In the present embodiment, the length Lb is 0.6% of the length of the tire circumference. When the length Lb is equal to or greater than 0.1% of the length of the tire circumference, the volume of the first middle land portion 41 is ensured, and thus the stiffness of the first middle land portion 41 is maintained. When the length Lb is equal to or less than 2.5% of the length of the tire circumference, the first slot 201 and the third slot 203 can relieve the force generated in the first middle land portion 41 during cornering. Thus, the wear resistance of the tire 1 is improved. From the viewpoint of effectively maintaining the stiffness and effectively relieving the force generated during cornering, the length Lb is preferably equal to or greater than 0.4% and equal to or less than 0.8% of the length of the tire circumference.

The depth of each of the first slot 201 and the third slot 203 may be equal to or greater than 1% and equal to or less than 35% of the depth of each circumferential groove 3.

In the present embodiment, the depth of each of the first slot 201 and the third slot 203 is 6.6% of the depth of each circumferential groove 3. The depths of the first slot 201 and the third slot 203 may be different from each other. In addition, the depths of the first slot 201 and the second slot 202 are substantially equal to each other. Similarly, the depths of the third slot 203 and the fourth slot 204 are also substantially equal to each other. When the depth of each of the first slot 201 and the third slot 203 is equal to or greater than 1% of the depth of each circumferential groove 3, deformation of the first middle land portion 41 is appropriately allowed. Thus, local application of force to the first middle land portion 41 can be relieved. In addition, when the depth of each of the first slot 201 and the third slot 203 is equal to or less than 35% of the depth of each circumferential groove 3, the stiffness of the first middle land portion 41 is maintained. As a result, the wear resistance of the tire 1 is improved. From the viewpoint of effectively relieving local application of force and effectively maintaining the stiffness, the depth of each of the first slot 201 and the third slot 203 is preferably equal to or greater than 5% and equal to or less than 14% of the depth of each circumferential groove 3.

The straight line L7 connecting the first end 200*a* and the second end 200*b* in the tread surface Ts of each of the first slot 201 and the third slot 203 may form an angle γ equal to or greater than 45° and equal to or less than 90° with respect to the tire axial direction.

In the present embodiment, the angles γ of the first slot 201 and the third slot 203 are each 90°. The angles γ of the first slot 201 and the third slot 203 may be different from each other. In addition, the angles γ of the first slot 201 and the second slot 202 are substantially equal to each other. Similarly, the angles γ of the third slot 203 and the fourth slot 204 are also substantially equal to each other. When each angle γ is equal to or greater than 45° and equal to or less than 90°, the force acting on the tire 1 during running is effectively dispersed. Thus, the wear resistance of the tire 1 is improved. From the viewpoint of effectively improving the wear resistance of the tire 1, the angle γ is preferably equal to or greater than 80° with respect to the tire axial direction.

A straight line L10 extending from the first end 200a to the bent portion 200c in the tread surface Ts of each of the first slot 201 and the third slot 203 and a straight line L11 extending from the second end 200b to the bent portion 200c in the tread surface Ts of each of the first slot 201 and the third slot 203 may each form an angle equal to or greater than 45° and equal to or less than 90° with respect to the tire axial direction.

An angle δ1a shown in FIG. 3A indicates an angle of the straight line L10 of the first slot 201 with respect to the tire axial direction. An angle δ1b indicates an angle of the straight line L11 of the first slot 201 with respect to the tire axial direction. An angle δ2a indicates an angle of the straight line L10 of the third slot 203 with respect to the tire axial direction. An angle δ2b indicates an angle of the straight line L11 of the third slot 203 with respect to the tire axial direction. In the present embodiment, each of the angle δ1a, the angle δ1b, the angle δ2a, and the angle δ2b is 60° with respect to the tire axial direction. The angle Ma, the angle δ1b, the angle δ2a, and the angle δ2b may be different from each other. As described above, the first slot 201 and the third slot 203 of the first middle land portion 41 have a substantially point-symmetrical relationship with the second slot 202 and the fourth slot 204 of the second middle land portion 42 about the midpoint 100c. Thus, the angles of the second slot 202 corresponding to the angle δ1a and the angle δ1b of the first slot 201 are substantially equal to each other. Similarly, the angles of the fourth slot 204 corresponding to the angle δ2a and the angle δ2b of the third slot 203 are also substantially equal to each other. When each of the angle δ1a, the angle δ1b, the angle δ2a, and the angle δ2b is equal to or greater than 45° and equal to or less than 90° with respect to the tire axial direction, occurrence of catching and uneven wear such as rib punch during running is suppressed. Thus, the wear resistance of the tire 1 is improved.

Figure 3B:
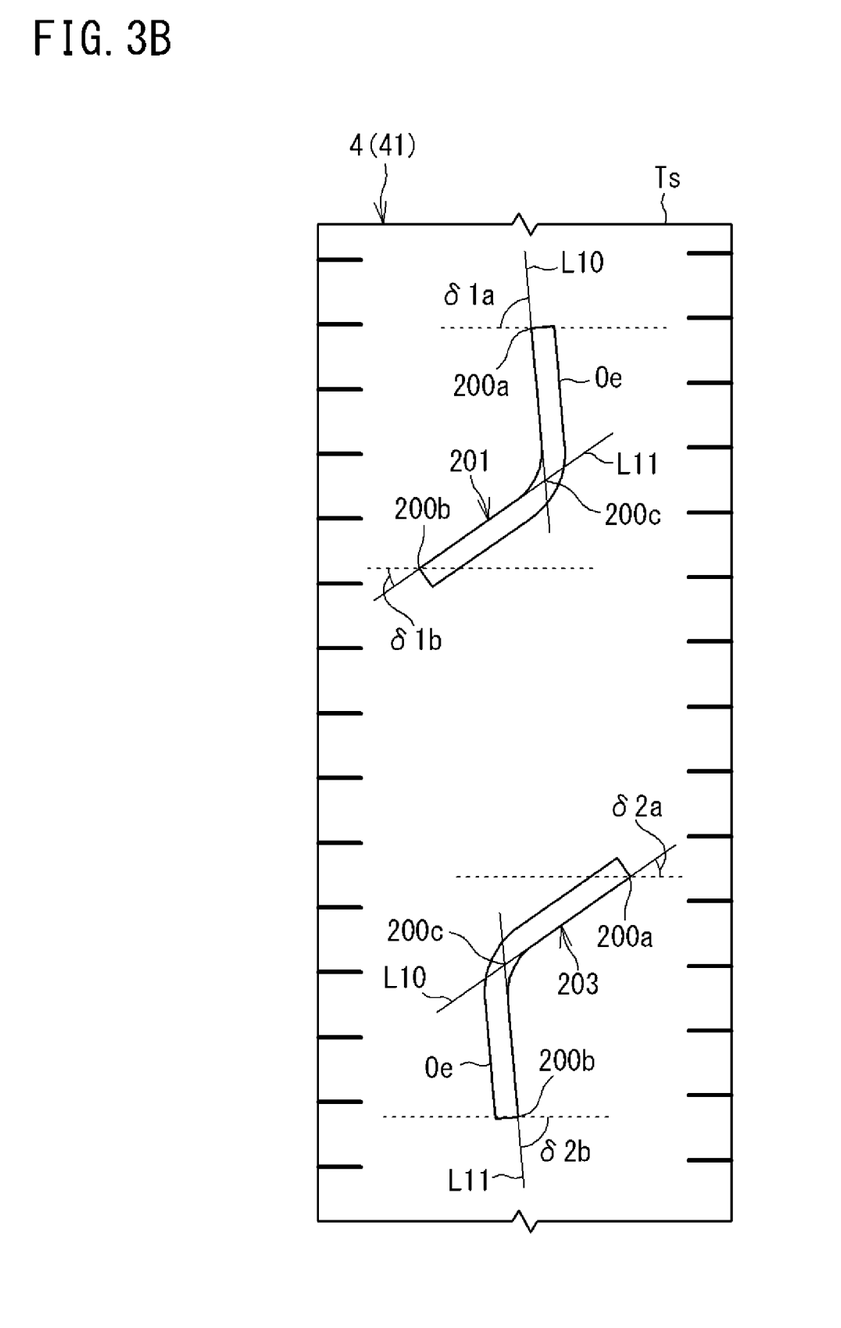
FIG. 3B is a diagram showing a third modification in which angles of slots with respect to a tire axial direction in FIG. 3A are changed.

FIG. 3B is a diagram showing a third modification in which the angles of the first slot 201 and the third slot 203 with respect to the tire axial direction in FIG. 3A are changed. Each of the angle δ1b of the first slot 201 and the angle δ2a of the third slot 203 shown in FIG. 3B is 35° with respect to the tire axial direction. In addition, each of the angle δ1a of the first slot 201 and the angle δ2b of the third slot 203 is 85° with respect to the tire axial direction. Each of the angle δ1a, the angle δ1b, the angle δ2a, and the angle δ2b in the third modification is equal to or greater than 45° and equal to or less than 90°. Thus, occurrence of catching and uneven wear such as rib punch during running is suppressed. As a result, the wear resistance of the tire 1 is improved.

Figure 3C:
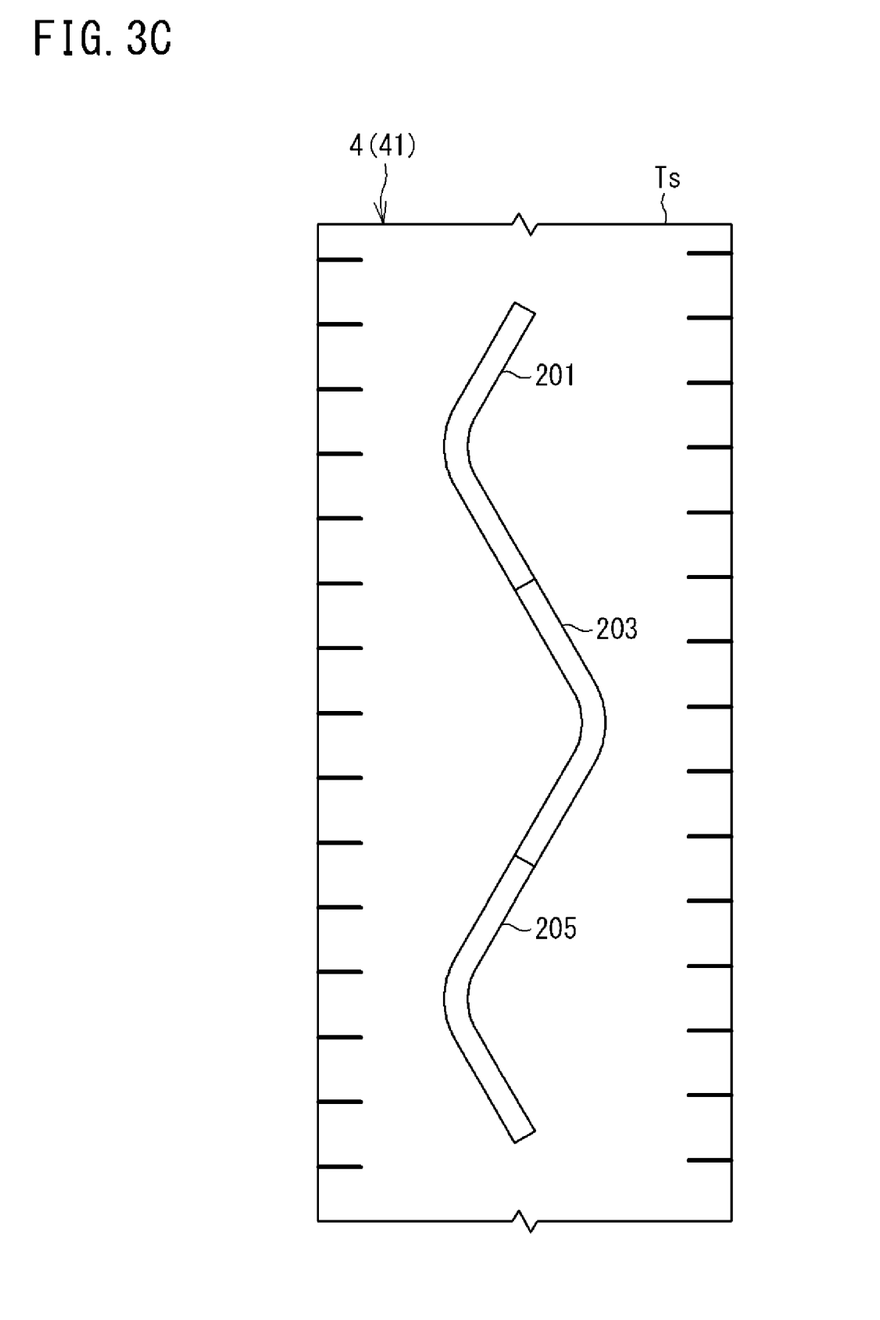
FIG. 3C is a diagram showing a fourth modification in which arrangement of the slots of the middle land portion in FIG. 3A is changed.

FIG. 3C is a diagram showing a fourth modification in which the arrangement of the slots of the first middle land portion 41 in FIG. 3A is changed. The first middle land portion 41 shown in FIG. 3C has a first slot 201, a third slot 203, and a fifth slot 205. The first slot 201, the third slot 203, and the fifth slot 205 which are shown in FIG. 3C are located in the first middle land portion 41 so as to be substantially contiguous to each other. The fifth slot 205 of the first middle land portion 41 is located so as to be substantially point-symmetrical to the sixth slot 206 of the second middle land portion 42 about the midpoint 100c (not shown).

Figure 3D:
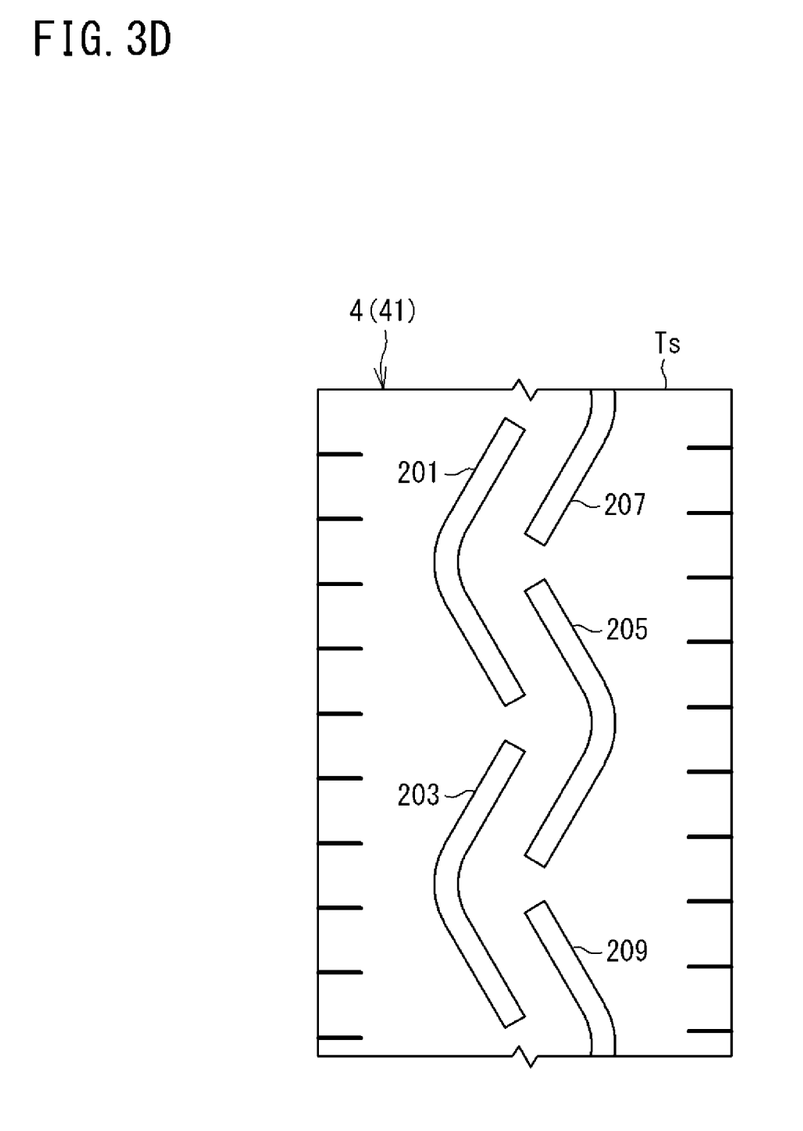
FIG. 3D is a diagram showing a fifth modification in which the arrangement of the slots of the middle land portion in FIG. 3A is changed.

FIG. 3D is a diagram showing a fifth modification in which the arrangement of the slots of the first middle land portion 41 in FIG. 3A is changed. The first middle land portion 41 shown in FIG. 3D has a first slot 201, a third slot 203, a fifth slot 205, a seventh slot 207, and a ninth slot 209. The fifth slot 205, the seventh slot 207, and the ninth slot 209 which are shown in FIG. 3D are located so as to be aligned in the tire circumferential direction and overlap the first slot 201 and the third slot 203 in the tire axial direction. The seventh slot 207 and the ninth slot 209 of the first middle land portion 41 are located so as to be substantially point-symmetrical to an eighth slot 208 and a tenth slot 210 of the second middle land portion 42 about the midpoint 100c (not shown).

Figure 4:
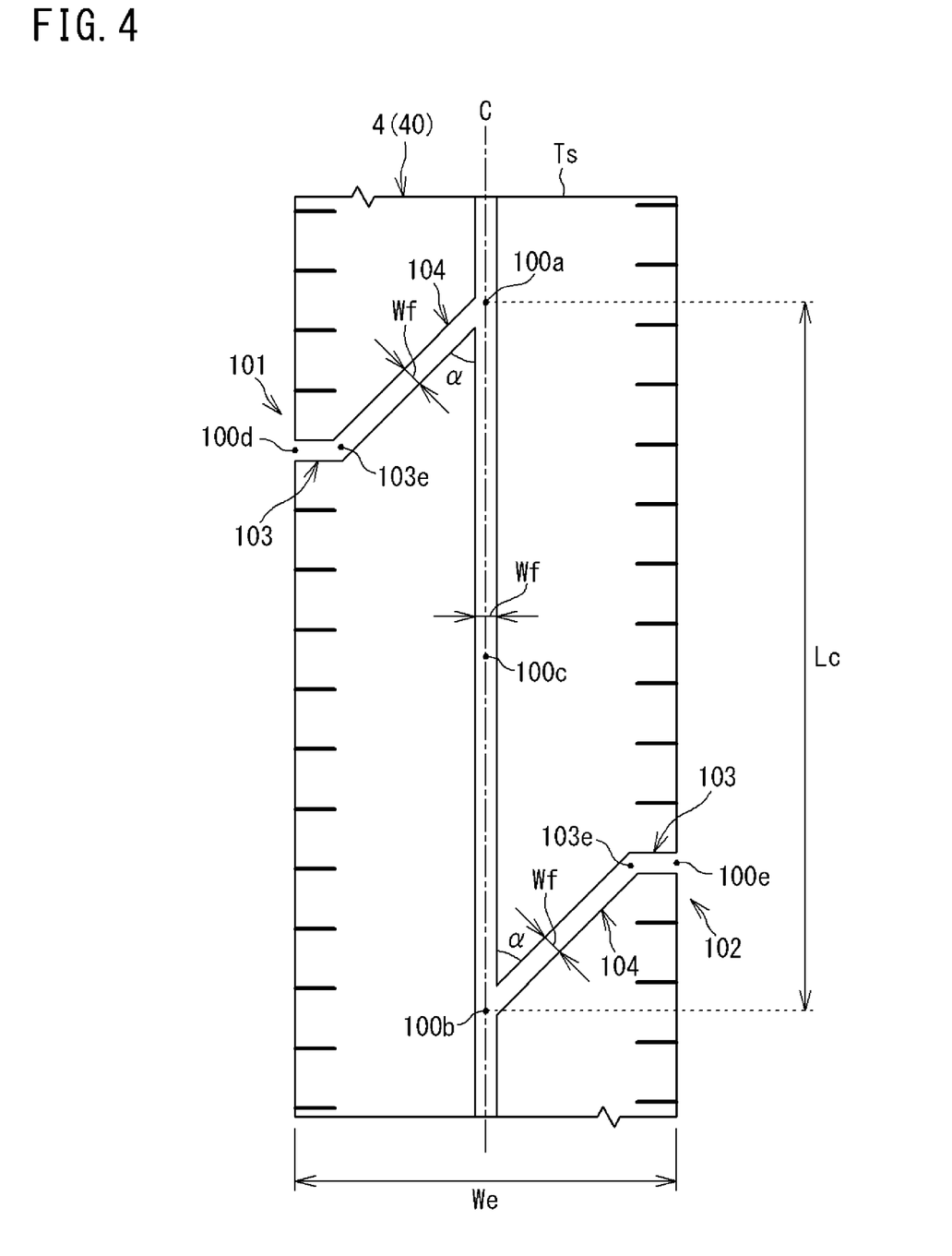
FIG. 4 is an enlarged view of the crown land portion in FIG. 1.

FIG. 4 is an enlarged view of the crown land portion 40 in FIG. 1. A length Lc at the tire equator C from the first position 100a at which the first sub-crown shallow groove 101 communicates with the main crown shallow groove 100 to the second position 100b at which the second sub-crown shallow groove 102 communicates with the main crown shallow groove 100 may be equal to or greater than 1.5% and equal to or less than 2.5% of the length of the tire circumference.

Each of the first sub-crown shallow groove 101 and the second sub-crown shallow groove 102 in the present embodiment includes, in a plan view, a straight portion 103 extending from the crown circumferential groove 30 in the tire axial direction in a straight manner, and an inclined portion 104 extending from an inner end 103e of the straight portion 103 so as to be inclined relative to the tire equator C. The straight portion 103 improves the wet performance since the drainage resistance in the groove is small at the straight portion 103. The inclined portion 104 improves the braking performance and the side slip resistance on a road surface by the groove edge thereof. In the present embodiment, each of the first sub-crown shallow groove 101 and the second sub-crown shallow groove 102 includes the straight portion 103 and the inclined portion 104, but is not limited thereto. For example, each of the first sub-crown shallow groove 101 and the second sub-crown shallow groove 102 can be configured not to include the straight portion 103. In addition, for example, each of the first sub-crown shallow groove 101 and the second sub-crown shallow groove 102 can also be configured such that the inclination of the inclined portion 104 relative to the tire equator C gradually increases or decreases.

In the present embodiment, the length Lc is 1.9% of the length of the tire circumference. When the length Lc is equal to or greater than 1.5% of the length of the tire circumference, the volume of the crown land portion 40 is ensured. Thus, the stiffness of the crown land portion 40 is maintained. When the length Lc is equal to or less than 2.5% of the length of the tire circumference, the force generated in the crown land portion 40 during running is relieved in the crown land portion 40. As a result, the wear resistance of the tire 1 is improved.

A width Wf of each of the main crown shallow groove 100, the first sub-crown shallow groove 101, and the second sub-crown shallow groove 102 may be equal to or greater than 1% and equal to or less than 30% of a width We of the crown land portion 40.

The width Wf of each of the main crown shallow groove 100, the first sub-crown shallow groove 101, and the second sub-crown shallow groove 102 in the present embodiment is 3.3% of the width We. When each width Wf is equal to or greater than 1% and equal to or less than 30% of the width We, the main crown shallow groove 100, the first sub-crown shallow groove 101, and the second sub-crown shallow groove 102 can relieve the force generated in the crown land portion 40 during cornering. Thus, uneven wear of the crown land portion 40 is suppressed. As a result, the wear resistance of the tire 1 is improved. From the viewpoint of effectively suppressing uneven wear, the width Wf is preferably equal to or greater than 3% and equal to or less than 7% of the width We.

In the present embodiment, the width We in the tire axial direction of the crown land portion 40 is preferably 13% to 16% of the tread width TW (shown in FIG. 1).

Each of the first sub-crown shallow groove 101 and the second sub-crown shallow groove 102 may communicate with the main crown shallow groove 100 at an angle α equal to or greater than 40° and equal to or less than 60°.

In the present embodiment, the angle α is 45°. When the angle α is equal to or greater than 40°, force from a direction oblique to the rotation direction of the tire 1 is relieved. When the angle α is equal to or less than 60°, occurrence of catching and uneven wear such as rib punch at the first sub-crown shallow groove 101 and the second sub-crown shallow groove 102 during running is suppressed. Thus, the wear resistance of the tire 1 is improved. From the viewpoint of effectively suppressing uneven wear, the angle α is preferably equal to or less than 50°.

The depth of each of the main crown shallow groove 100, the first sub-crown shallow groove 101, and the second sub-crown shallow groove 102 may be equal to or greater than 1% and equal to or less than 35% of the depth of each circumferential groove 3.

In the present embodiment, the depth of each of the main crown shallow groove 100, the first sub-crown shallow groove 101, and the second sub-crown shallow groove 102 is 6.6% of the depth of each circumferential groove 3. When the depth of each of the main crown shallow groove 100, the first sub-crown shallow groove 101, and the second sub-crown shallow groove 102 is equal to or greater than 1% of the depth of each circumferential groove 3, deformation of the crown land portion 40 is appropriately allowed. Thus, local application of force to the crown land portion 40 can be relieved. In addition, when the depth of each of the main crown shallow groove 100, the first sub-crown shallow groove 101, and the second sub-crown shallow groove 102 is equal to or less than 35% of the depth of each circumferential groove 3, the stiffness of the crown land portion 40 is maintained. As a result, the wear resistance of the tire 1 is improved. From the viewpoint of effectively relieving local application of force and effectively maintaining the stiffness, the depth of each of the main crown shallow groove 100, the first sub-crown shallow groove 101, and the second sub-crown shallow groove 102 is preferably equal to or greater than 5% and equal to or less than 14% of the depth of each circumferential groove 3.

As is obvious from the above description, according to the present invention, the uneven wear resistance of the tire is improved.

EXAMPLES

The following will describe the present invention in further detail by means of examples, etc., but the present invention is not limited to these examples.

Tires with a size of 295/75R22.5 having the basic pattern in FIG. 1 were produced as sample tires on the basis of specifications in Table 1, and the uneven wear resistance of each sample tire was tested. The common specifications and the test method for the respective test tires are as follows.

Width Wa of middle land portion/TW: 13.6%
Width We of crown land portion/TW: 13.6%
Groove depth D1 of circumferential groove: 14.6 mm
Angle α at which sub-crown shallow groove communicates with main crown shallow groove: 45°

<Uneven Wear Resistance>

The respective sample tires were mounted to rims and attached to eight wheels of a 2-axle trailer towed by a 10-ton truck (2DD vehicle), the truck was caused to run on a test course with an asphalt road surface for 20,000 km, and the wear amount of each middle land portion was measured. For the wear amount, measurements were made at six locations in the circumferential direction on each of both edges of the right and left middle land portions, and the average of the measured values at these locations (n=24) was regarded as the wear amount. The reciprocal of the average wear amount was obtained, and the results are shown as indexes with the value of Comparative Example 1 being regarded as 100. A higher value indicates that the uneven wear resistance is better.

Rim: 22.5×8.25
Internal pressure: 830 kPa
Load: 27.46 kN
The results of the test are shown in Table 1.
In Table 1, Da indicates the depth of "V-shaped" slots, and Db indicates the depth of a main crown shallow groove and a sub-crown shallow groove.

TABLE 1

|  | Example 1 | Example 2 | Example 3 | Example 4 | Example 5 | Example 6 | Comparative Example 1 | Comparative Example 2 | Comparative Example 3 | Comparative Example 4 |
| --- | --- | --- | --- | --- | --- | --- | --- | --- | --- | --- |
| Basic shape of tread | FIG. 1 | FIG. 1 | FIG. 1 | FIG. 1 | FIG. 1 | FIG. 1 | FIG. 1 | FIG. 1 | FIG. 1 | FIG. 2D |
| "V-shaped" slots | Presence | Presence | Presence | Presence | Presence | Presence | Absence | Presence | Absence | Presence |
| Main crown shallow groove and sub-crown shallow groove | Presence | Presence | Presence | Presence | Presence | Presence | Absence | Absence | Presence | Presence |
| Wb/Wa (%) | 25 | 5 | 75 | 25 | 25 | 25 | — | 25 | — | 25 |
| Wc/Wa (%) | 25 | 25 | 25 | 0.1 | 25 | 25 | — | 25 | — | 25 |
| Wd/Wa (%) | 3.3 | 3.3 | 3.3 | 3.3 | 3.3 | 3.3 | — | 3.3 | — | 3.3 |
| La/tire circumference length (%) | 0.6 | 0.6 | 0.6 | 0.6 | 0.6 | 0.6 | — | 0.6 | — | 0.6 |

TABLE 1-continued

|  | Example 1 | Example 2 | Example 3 | Example 4 | Example 5 | Example 6 | Comparative Example 1 | Comparative Example 2 | Comparative Example 3 | Comparative Example 4 |
|---|---|---|---|---|---|---|---|---|---|---|
| Lb/tire circumference length (%) | 0.6 | 0.6 | 0.6 | 0.6 | 0.1 | 0.6 | — | 0.6 | — | 0.6 |
| Da/D1 (%) | 6.6 | 6.6 | 6.6 | 6.6 | 6.6 | 6.6 | — | 6.6 | — | 6.6 |
| Lc/tire circumference length (%) | 1.9 | 1.9 | 1.9 | 1.9 | 1.9 | 1.9 | — | — | 1.9 | 1.9 |
| Wf/Wa (%) | 3.3 | 3.3 | 3.3 | 3.3 | 3.3 | 30 | — | — | 3.3 | 3.3 |
| α (°) | 45 | 45 | 45 | 45 | 45 | 45 | — | — | 45 | 45 |
| Db/D1 (%) | 6.6 | 6.6 | 6.6 | 6.6 | 6.6 | 6.6 | — | — | 6.6 | 6.6 |
| Whether pattern has point-symmetry about midpoint 100c | Point-symmetry | Point-symmetry | Point-symmetry | Point-symmetry | Point-symmetry | Point-symmetry | Point-symmetry | Point-symmetry | Point-symmetry | Non-point symmetry |
| Uneven wear resistance [index: higher value is better] | 130 | 125 | 125 | 125 | 125 | 125 | 100 | 110 | 120 | 110 |

From Table 1, it is found that the tires of Examples 1 to 6 each having "V-shaped" slots, a main crown shallow groove, and a sub-crown shallow groove and having a pattern having point-symmetry about the midpoint 100c had improved uneven wear resistance. Meanwhile, it is found that the uneven wear resistance of the tires of Comparative Examples 1 to 4 in which at least either "V-shaped" slots, a main crown shallow groove, and a sub-crown shallow groove, or a pattern having point-symmetry about the midpoint 100c was absent was not improved as much as compared to the uneven wear resistance of the tires of Examples 1 to 6. From the results, it is found that a combination of "V-shaped" slots, a main crown shallow groove, and a sub-crown shallow groove and a pattern having point-symmetry about the midpoint 100c is effective for improving the uneven wear of a tire.

INDUSTRIAL APPLICABILITY

The above-described technology regarding improvement of the uneven wear resistance of a tire can be applied to various tires.

REFERENCE SIGNS LIST 1 tire
2 tread
3 circumferential groove
30 crown circumferential groove
31 shoulder circumferential groove
4 land portion
40 crown land portion
41 first middle land portion
42 second middle land portion
43 shoulder land portion
100 main crown shallow groove
100a first position
100b second position
100c midpoint
100d third position
100e fourth position
101 first sub-crown shallow groove
102 second sub-crown shallow groove
201 first slot
202 second slot
203 third slot
204 fourth slot
200a first end
200b second end
200c bent portion
C tire equator
L1 first reference line
L2 second reference line
L3 straight line connecting bent portion 200c of first slot 201 and third position 100d
L4 straight line connecting bent portion 200c of second slot 202 and fourth position 100e
L5 straight line connecting bent portion 200c of third slot 203 and fourth position 100e
L6 straight line connecting bent portion 200c of fourth slot 204 and third position 100d
L7 straight line connecting first end 200a and second end 200b
Lb shortest length from straight line L8 to straight line L9
Wa width in tire axial direction of first middle land portion 41
Wb shortest length to edge of first middle land portion 41
Wc widths in tire axial direction of first slot 201 and third slot 203
Wd widths of first slot 201, second slot 202, third slot 203, and fourth slot 204
Wf widths of main crown shallow groove 100, first sub-crown shallow groove 101, and second sub-crown shallow groove 102
β1a angle of straight line L3 with respect to first reference line L1
β1b angle of straight line L5 with respect to second reference line L2
β2a angle of straight line L4 with respect to second reference line L2
β2b angle of straight line L6 with respect to first reference line L1

The invention claimed is:

1. A tire comprising four circumferential grooves and five land portions provided in a tread thereof, wherein
the circumferential grooves include a pair of crown circumferential grooves located on both sides of a tire equator, and a pair of shoulder circumferential grooves located outward of the crown circumferential grooves,
the land portions include a crown land portion demarcated by the crown circumferential grooves, and a pair of middle land portions each demarcated by the crown circumferential groove and the shoulder circumferential groove,
the crown land portion includes a main crown shallow groove extending at the tire equator, and at least two sub-crown shallow grooves each extending so as to communicate with the crown circumferential groove and the main crown shallow groove, the pair of middle land portions includes V-shaped slots recessed from a tread surface, respectively, and the sub-crown shallow grooves and the slots are located so as to be substantially point-symmetrical about a midpoint between positions at which the adjacent sub-crown shallow grooves communicate with the main crown shallow groove, wherein a shortest length from an opening edge of each of the slots to an edge of the middle land portion is equal to or greater than 15% and equal to or less than 35% of a width of the middle land portion.

2. The tire according to claim 1, wherein a shortest length from a bent portion of each of the slots that is bent in a V shape to a straight line connecting a first end and a second end that are both ends in a longitudinal direction of the slot is equal to or greater than 0.1% and equal to or less than 80% of a width of the middle land portion.

3. The tire according to claim 2, wherein the shortest length from the bent portion of each of the slots that is bent in a V shape to the straight line connecting the first end and the second end that are both ends in the longitudinal direction of the slot is equal to or greater than 15% and equal to or less than 35% of the width of the middle land portion.

4. The tire according to claim 1, wherein a width of each of the main crown shallow groove and the sub-crown shallow grooves is equal to or greater than 1% and equal to or less than 30% of a width of the crown land portion.

5. The tire according to claim 4, wherein the width of each of the main crown shallow groove and the sub-crown shallow grooves is equal to or greater than 3% and equal to or less than 7% of the width of the crown land portion.

6. The tire according to claim 1, wherein each of the slots is located so as to intersect a reference line that is parallel to a tire axial direction and that passes through a position at which the sub-crown shallow groove communicates with the crown circumferential groove.

7. The tire according to claim 6, wherein a straight line connecting a bent portion of each of the slots and the position at which the sub-crown shallow groove communicates with the crown circumferential groove forms an angle equal to or greater than 0° and equal to or less than 15° with respect to the reference line.

8. The tire according to claim 7, wherein the straight line connecting the bent portion of each of the slots and the position at which the sub-crown shallow groove communicates with the crown circumferential groove forms an angle equal to or greater than 2° and equal to or less than 8° with respect to the reference line.

9. The tire according to claim 6, wherein one of the slots of the pair of middle land portions each of which is located so as to intersect the reference line is located on the crown circumferential groove side, and the other slot is located on the shoulder circumferential groove side.

10. The tire according to claim 1, wherein
the pair of middle land portions each include the slots adjacent to each other in a circumferential direction, and
a shortest length between the slots adjacent to each other is equal to or greater than 0.1% and equal to or less than 2.5% of a length of a tire circumference.

11. The tire according to claim 10, wherein the shortest length between the slots adjacent to each other is equal to or greater than 0.4% and equal to or less than 0.8% of the length of the tire circumference.

12. The tire according to claim 1, wherein a depth of each of the slots is equal to or greater than 1% and equal to or less than 35% of a depth of each circumferential groove.

13. The tire according to claim 12, wherein the depth of each of the slots is equal to or greater than 5% and equal to or less than 14% of the depth of each circumferential groove.

14. The tire according to claim 1, wherein a straight line connecting a first end and a second end that are both ends in a longitudinal direction of each of the slots forms an angle equal to or greater than 45° and equal to or less than 90° with respect to a tire axial direction.

15. The tire according to claim 14, wherein the straight line connecting the first end and the second end that are both ends in the longitudinal direction of each of the slots forms an angle equal to or greater than 80° and equal to or less than 90° with respect to the tire axial direction.

16. The tire according to claim 1, wherein a straight line extending from a first end that is an end in a longitudinal direction of each of the slots to a bent portion of each of the slots that is bent in a V shape, and a straight line extending from a second end that is another end in the longitudinal direction of each of the slots to the bent portion each form an angle equal to or greater than 45° and equal to or less than 90° with respect to a tire axial direction.

17. The tire according to claim 1, wherein each of the sub-crown shallow grooves communicates with the main crown shallow groove at an angle equal to or greater than 40° and equal to or less than 60°.

18. The tire according to claim 1, wherein a depth of each of the main crown shallow groove and the sub-crown shallow grooves is equal to or greater than 1% and equal to or less than 35% of a depth of each circumferential groove.

19. A tire comprising four circumferential grooves and five land portions provided in a tread thereof, wherein
the circumferential grooves include a pair of crown circumferential grooves located on both sides of a tire equator, and a pair of shoulder circumferential grooves located outward of the crown circumferential grooves,
the land portions include a crown land portion demarcated by the crown circumferential grooves, and a pair of middle land portions each demarcated by the crown circumferential groove and the shoulder circumferential groove,
the crown land portion includes a main crown shallow groove extending at the tire equator, and at least two sub-crown shallow grooves each extending so as to communicate with the crown circumferential groove and the main crown shallow groove,
the pair of middle land portions includes V-shaped slots recessed from a tread surface, respectively, and
the sub-crown shallow grooves and the slots are located so as to be substantially point-symmetrical about a midpoint between positions at which the adjacent sub-crown shallow grooves communicate with the main crown shallow groove,
wherein each of the slots is located so as to intersect a reference line that is parallel to a tire axial direction and that passes through a position at which the sub-crown shallow groove communicates with the crown circumferential groove, and
wherein one of the slots of the pair of middle land portions each of which is located so as to intersect the reference line is located on the crown circumferential groove side, and the other slot is located on the shoulder circumferential groove side.

* * * * *